United States Patent [19]
Fernlund

[11] 3,796,472
[45] Mar. 12, 1974

[54] TRIPLE RING BEARINGS

[75] Inventor: Lars Martin Ingemar Fernlund, Hindas, Sweden

[73] Assignee: SKF Industrial Trading and Development Company B.V., Amsterdam, Netherlands

[22] Filed: Oct. 13, 1972

[21] Appl. No.: 297,387

[30] Foreign Application Priority Data
Dec. 2, 1971 Sweden.......................... 15429/71

[52] U.S. Cl. ................................................ 308/35
[51] Int. Cl. .......................................... F16c 21/00
[58] Field of Search ................ 308/35, 194; 64/6, 7

[56] References Cited
UNITED STATES PATENTS
3,187,591  6/1965  Johnson .............................. 308/35

Primary Examiner—Charles J. Myhre
Assistant Examiner—Frank Susko
Attorney, Agent, or Firm—Howson and Howson

[57] ABSTRACT

A bearing with three concentric bearing rings situated in the same plane which are rotatable in relation to each other and where the intermediate ring is intended to transmit a torque from one side of the bearing to the other, characterized by that the inner surface of the outer ring comprises hydrostatic bearing pockets to which a pressure fluid can be supplied, and that the inner surface of the intermediate ring constitutes one or more raceways for a rolling bearing, preferably a spherical roller bearing.

3 Claims, 1 Drawing Figure

PATENTED MAR 12 1974 3,796,472
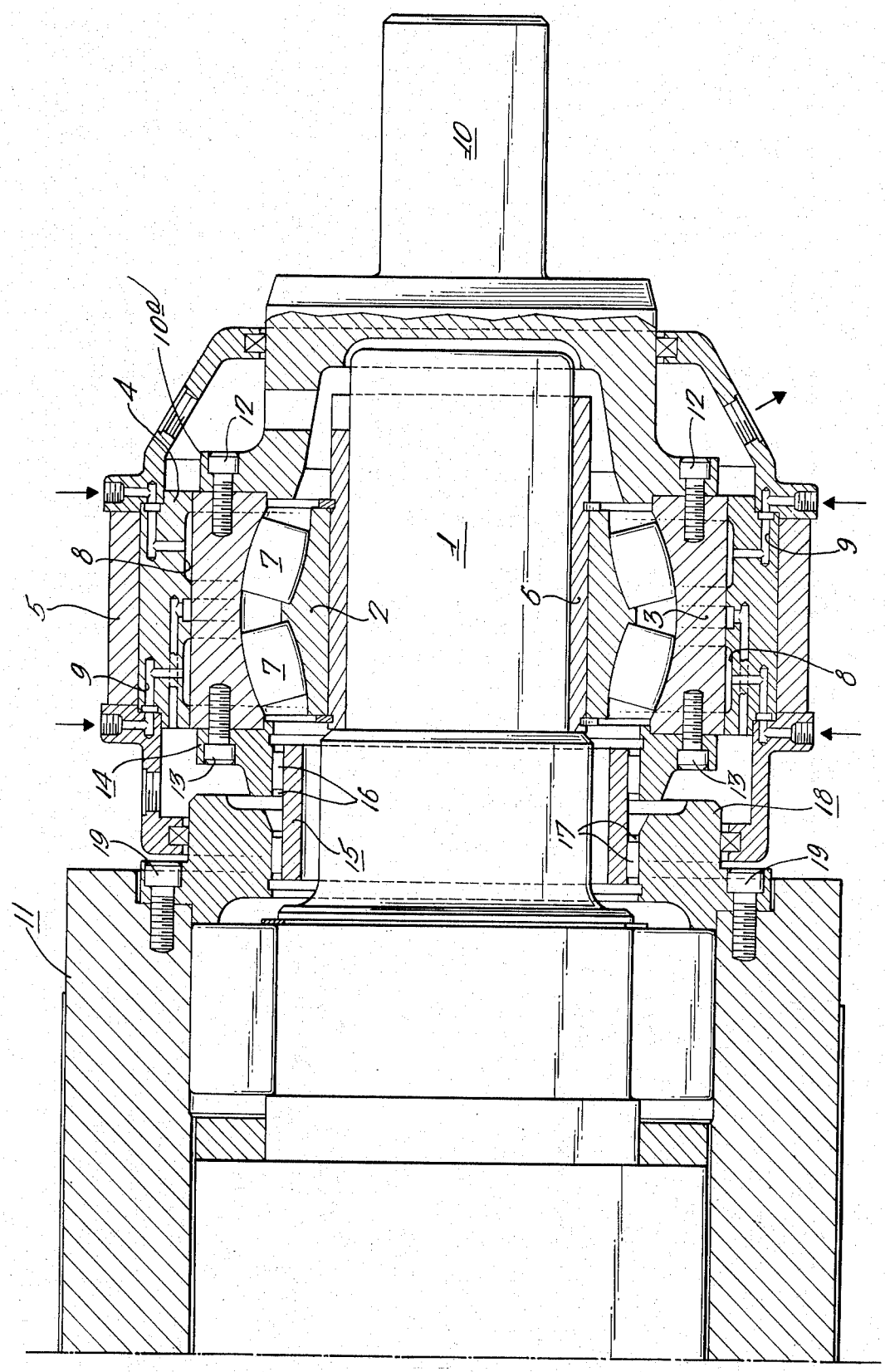

TRIPLE RING BEARINGS

The invention refers to triple ring bearings, i.e. to bearings having three concentric race rings which are arranged in the same plane and are rotatable in relation to each other. Triple rings bearings are used e.g. when supporting a shaft and a rotatable sleeve on this shaft, to which sleeve a torque is to be transmitted through the supporting bearing. Hereby the inner ring of the bearing is mounted on the shaft, the outer ring is mounted in a housing and the intermediate ring is connected to the rotatable sleeve. The torque can thus be transmitted to the sleeve via the intermediate ring, which is rotatable in relation to both the inner and the outer ring.

If the triple ring bearing is completely designed as a rolling bearing, i.e. if it is provided with two concentric rows of rolling bodies in the same plane and positioned between the rings, the outer dimensions of the bearing will be comparatively large in relation to the load carrying capacity of the inner ring, which is a disadvantage.

This disadvantage is noticeable e.g. in paper making machines in which the outer sleeve constitutes a roll which is to co-operate with another roll with corresponding dimensions.

In such cases the bearing housing ought to have a smaller diameter than the roll, or e.g. mounting and dismounting of the respective rolls can be very complicated. Further, the bearing has to be able to take up heavy loads, which makes it difficult to keep the bearing dimension within permissible limits. These problems are solved according to this invention by providing the bearing with at least one hydrostatic bearing part. This means that the inner and intermediate ring of the bearing can be made larger without increasing the outer dimensions of the bearing, since the bearing will comprise maximum one layer of rolling bodies.

In the accompanying drawing an embodiment of the invention is shown in the shape of a section of a triple ring bearing and parts of surrounding machine components.

A shaft 1 is mounted in the triple ring bearing with the bearing rings 2,3,4, which is inserted in the housing.

Between the inner ring 2 and the shaft journal 1 is sleeve 6 is provided in order to enable the use of largest possible inner ring. The inner ring 2, the inner surface of the intermediate ring. 3 and two rows of rolling bodies 7, 7 constitute a spherical roller bearing part of the triple ring bearing. The outer ring therefore is provided with fluid pockets 8 and chanels 9 for delivery of a pressure medium to the pockets.

The intermediate ring 3 which is rotatable in relation to both the inner ring 2 and the outer ring 4, works as a torque transmitting part from a driven shaft journal 10 to a sleeve or roll 11 arranged outside the shaft 1. The sleeve 11 can thus be rotated on the stationary shaft 1, which is supported in the bearing housing 5. By the suitable design of the rings 2,3,4, and a sleeve 6, a triple ring bearing according to the invention can be used in existing triple ring bearing applications, whereby especially the inner ring and the intermediate ring may have a greater diameter and therefore a better load carrying capacity than what would be possible within the limits of the housing 5 if the bearing were provided with rolling bodies both between the inner ring and the intermediate ring and between the outer ring and intermediate ring. By arrangeing two pressure medium pockets 8 axially in a row in the hydrostatic bearing part this part will be capable of taking up a certain bending moment. As shown in the accompanying drawing, the drive connection between shaft journal 10 and roll 11 is effected by securing the flanged end $10^a$ of the journal 10 to the side of the inermediate ring 3 of the bearing by a plurality of suitable fastening means such as indicated at 12. Similar means 13 is provided at the opposite side of the ring 3 for attachment of a member 14, which in turn connects with a sleeve 15 by means of opposed interengaging teeth or splines 16 projecting from each. A second set of like projections 17 spaced apart from said first set. interengage with a member 18 secured to the roll 11 by fasteners 19, thus completing the drive train from journal 10.

I claim:

1. A bearing with three concentric bearing rings situated in the same plane which are rotatable in relation to each other and where the intermediate ring is intended to transmit a torque from one side of the bearing to the other, characterized by that the inner surface of the outer ring comprises hydrostatic bearing pockets to which a pressure fluid can be supplied, and that the inner surface of the intermediate ring constitutes one or more raceways for a rolling bearing, preferably a spherical roller bearing.

2. A bearing according to claim 1, characterized by that the hydrostatic bearing part is capable of taking up bending moments.

3. A bearing according to claim 1 or 2, characterized by that the inner ring is provided with a spacing and/or mounting sleeve for the mounting on a shaft.

* * * * *

UNITED STATES PATENT OFFICE
CERTIFICATE OF CORRECTION

Patent No. 3,796,472  Dated  March 12, 1974

Inventor(s)  Lars Martin Ingemar Fernlund

It is certified that error appears in the above-identified patent and that said Letters Patent are hereby corrected as shown below:

Column 2, line 49, after "mounting", second occurrence, insert -- of the bearing --.

Signed and sealed this 17th day of September 1974.

(SEAL)
Attest:

McCOY M. GIBSON JR.
Attesting Officer

C. MARSHALL DANN
Commissioner of Patents